United States Patent [19]
Kawaguchi

[11] Patent Number: 5,517,931
[45] Date of Patent: May 21, 1996

[54] INTERMITTENTLY DISCHARGING METHOD AND RECIPROCATING PUMP

[75] Inventor: Kousuke Kawaguchi, Chiba, Japan

[73] Assignee: Maruyama Mfg. Co., Inc., Tokyo, Japan

[21] Appl. No.: 312,620

[22] Filed: Sep. 27, 1994

[30] Foreign Application Priority Data

Sep. 27, 1993 [JP] Japan .................................. 5-260462

[51] Int. Cl.⁶ .................................................. F16H 21/16
[52] U.S. Cl. .............................. 111/118; 74/437; 74/55
[58] Field of Search ................... 60/487, 488, 489; 74/55, 437; 111/118, 120, 121, 122

[56] References Cited

U.S. PATENT DOCUMENTS

| | | | |
|---|---|---|---|
| 2,697,403 | 12/1954 | Benedek | 74/55 X |
| 2,936,632 | 5/1960 | Palmer | 74/55 X |
| 3,012,526 | 12/1961 | Baldwin et al. | |
| 3,971,259 | 7/1976 | Schotten | 74/437 X |
| 4,003,681 | 1/1977 | Wildhaber | 74/437 X |
| 4,803,964 | 2/1989 | Kurek et al. | 74/437 X |
| 5,101,745 | 4/1992 | Podevels et al. | |
| 5,119,744 | 6/1992 | Comer | |

FOREIGN PATENT DOCUMENTS

| | | |
|---|---|---|
| 4-505551 | 10/1992 | Japan . |
| 670604 | 3/1994 | Japan . |
| 6-165608 | 6/1994 | Japan . |
| 9107078 | 5/1991 | WIPO . |
| 9107077 | 5/1991 | WIPO . |

OTHER PUBLICATIONS

Yamazaki: "Design and Manufacturing of Non-circular gears and their application", Machine Design No. 11, vol. 29, Sep. 1985).

*Primary Examiner*—Terry Lee Melius
*Assistant Examiner*—Robert Pezzuto
*Attorney, Agent, or Firm*—Cushman, Darby & Cushman

[57] ABSTRACT

A plunger pump suitable for an apparatus for injecting liquid under high pressure through a plurality of nozzles (104) into the turf. A plunger (34) of the pump is connected through a connecting rod (39) to a crank shaft (12) for the reciprocation thereof, and the crank shaft is more quickly rotated through its angle of rotation at the discharge stroke than through the angle of rotation at the suction stroke of the plunger to increase discharge pressure of the liquid upon its intermittent injection.

1 Claim, 5 Drawing Sheets

INTERMITTENTLY DISCHARGING METHOD AND RECIPROCATING PUMP

BACKGROUND OF THE INVENTION

The present invention relates to a method of discharging intermittently liquid and a plunger pump suitable for a high pressure liquid injecting apparatus and more particularly, such a method and pump capable of increasing discharge pressure of the liquid upon its intermittent discharge. International publication of international application WO 91/07077 discloses intermittently injecting liquid under pressure through nozzles into the turf to form aerating holes in the turf. The high pressure liquid injecting apparatus includes an accumulator for accumulating liquid discharged from a pump and an intermittent valve connected between the accumulator and the nozzles to intermittently inject the liquid under pressure through the nozzles.

The high pressure liquid injecting apparatus disclosed in international application WO91/07077 is complicated in structure because of the need for the accumulator and the intermittent valve. Since the accumulator and the intermittent valve have no chemical and wear resistances, there might cause difficulties in injecting liquid of chemicals, fertilizer or the like containing fine particles for extermination and fertilization as well as aerating holes.

Japanese Patent Application Heisei 5-67342 discloses utilizing intermittent discharge of liquid from a plunger pump to intermittently inject the liquid through nozzles. This has an advantage in that any need for the accumulator and the intermittent valve as described can be eliminated. In the conventional plunger pump, the plunger is connected through a connecting rod to a crank shaft and rotation of the crank shaft causes the plunger to be reciprocated at a speed of displacement following a sine curve. Thus, an angle of rotation of a crank shaft at the discharge stroke is 180°. In order to increase the discharge pressure of liquid upon its intermittent discharge, increase in a speed of an engine is required to increase the speed of rotation of the crank shaft of the pump.

SUMMARY OF THE INVENTION

An object of the present invention is to provide a method of intermittently discharging liquid and a plunger pump which are capable of increasing discharge pressure of liquid from the pump without increasing the speed of rotation inputted to the pump.

This object of the invention can be achieved by providing a method of discharging intermittently liquid comprising utilizing a plunger pump including a pumping chamber and a reciprocating plunger to increase and reduce the volume of the pumping chamber, said plunger being connected through a connecting rod to a crank shaft for the reciprocation thereof, and rotating the crank shaft more quickly its angle of rotation at the discharge stroke than through the angle of rotation at the suction stroke of the plunger to increase discharge pressure of the liquid upon its intermittent injection.

According to the invention, there is also provided a plunger pump comprising a pumping chamber, a reciprocating plunger to increase and reduce the volume of the pumping chamber, a crank shaft connected through a connecting rod to said plunger for its reciprocation, an input shaft and non-circular driving and driven gears keyed to said input shaft and said crank shaft, respectively, to transmit rotation from said input shaft to said crank shaft, said non-circular driving and driven gears having their pitch curves set such that said crank shaft is rotated more quickly through its angle of rotation at the discharge stroke than through the angle of rotation at the suction stroke of the plunger.

The above and other objects and advantages of the invention will become more fully apparent from the following description of the embodiment of this invention, which is made with reference to the accompaning drawings in which.

Figure 1:
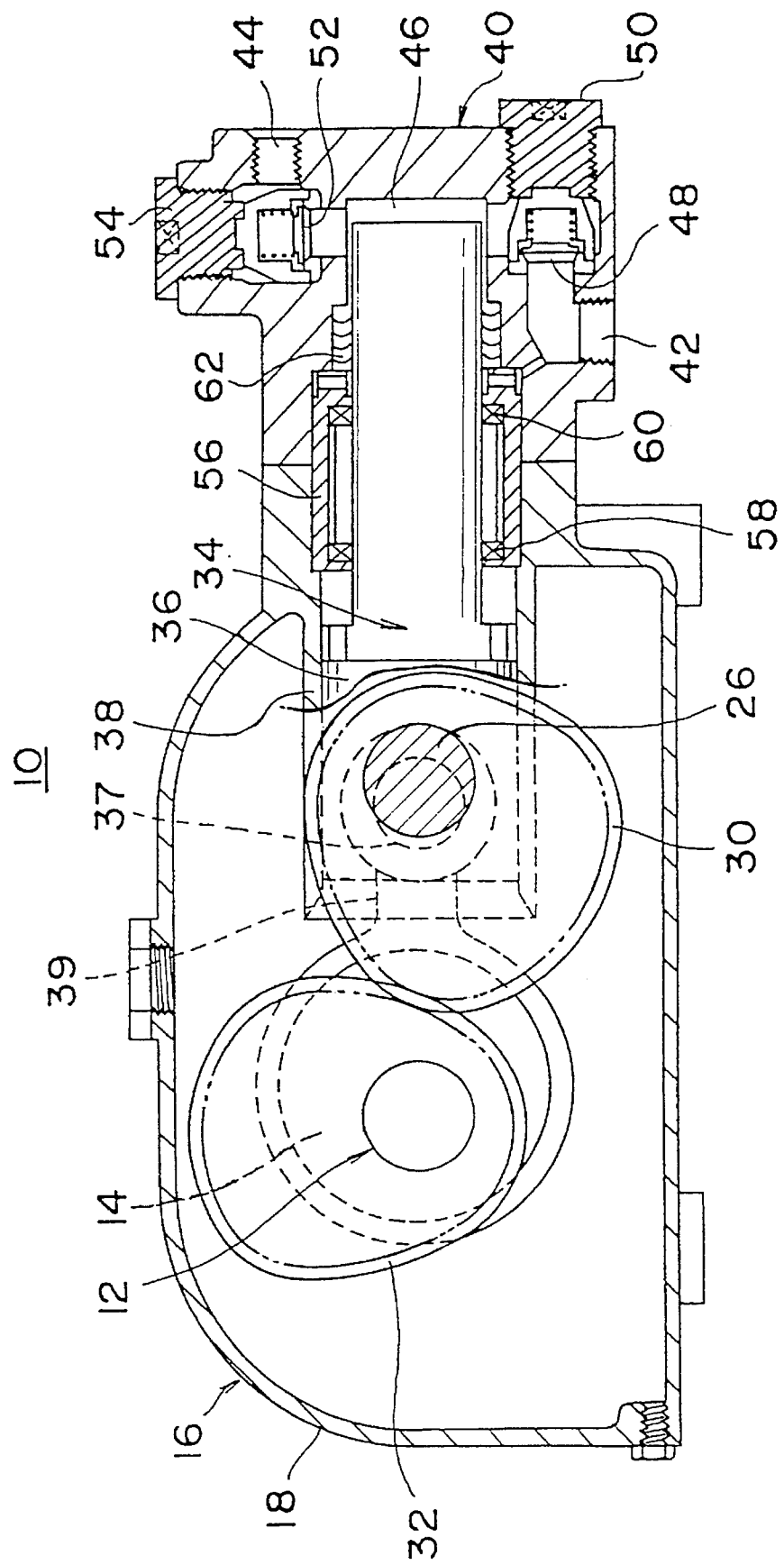
FIG. 1 is a side view in cross section of the plunger pump constructed in accordance with the present invention.
Figure 2:
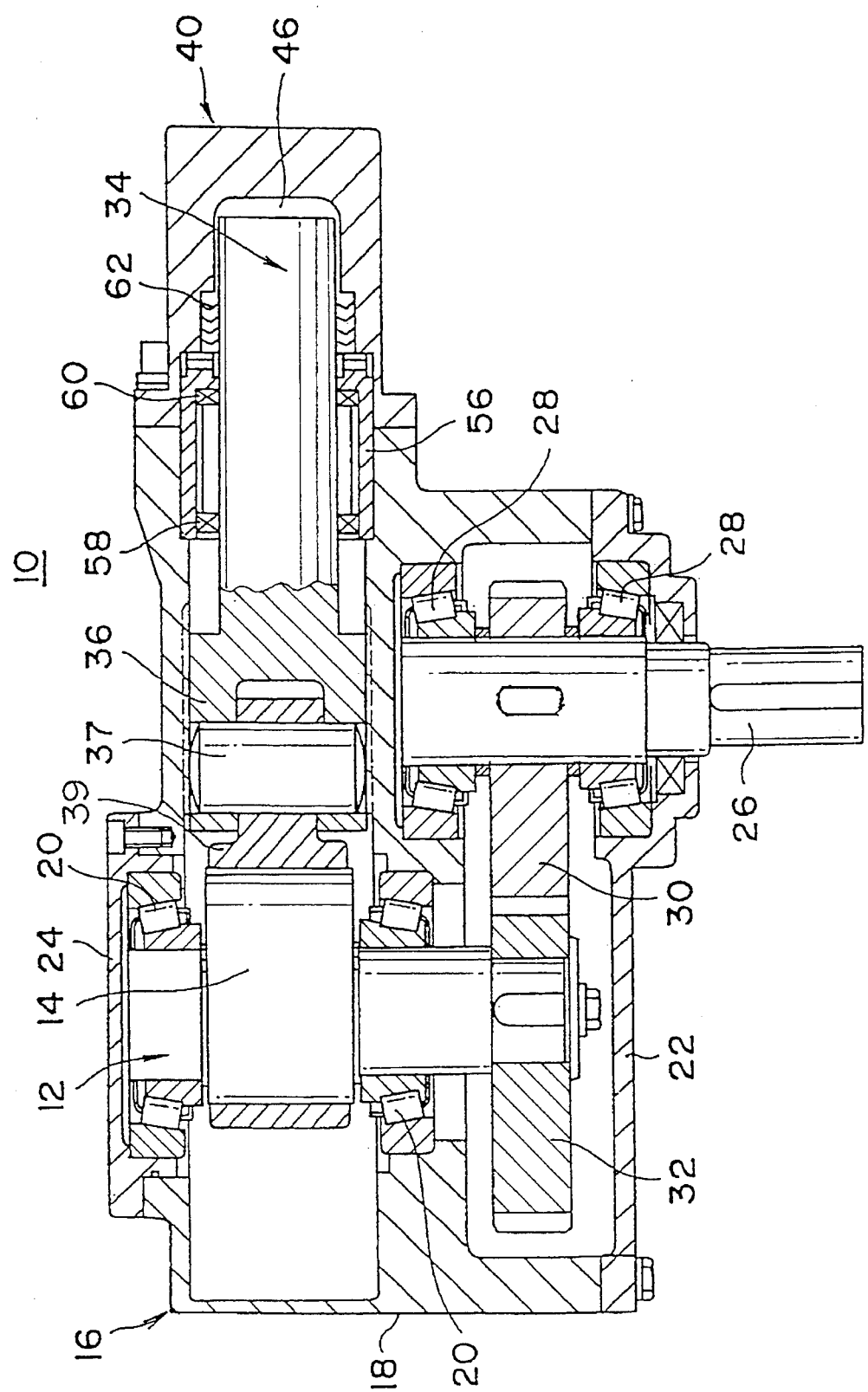
FIG. 2 is a plan view in cross section of the plunger pump.

Referring to FIG. 1 and 2 of the drawings, there is provided a plunger pump 10 including a crank-shaft 12 rotatively supported in bearings 20 and 20 mounted in a casing 18 and one of closures 22 and 24 secured to the casing 18 to close lateral openings of the casing. The casing 18 defines a crank case 16 within which an eccentric disk 14 is secured to the crank shaft 12. The eccentric disk has its center offset from an axis of the crank shaft 12. A driving shaft 26 extends parallel to the axis of the crank shaft 12 and is rotatively supported in bearings 28 and 28 mounted in the casing 18 and the other closure 22. Non-circular driving gear 30 and non-circular driven gear 32 each has a non-circular pitch curve and are keyed to the driving shaft 26 and the crank shaft 12 in an intermeshed relation, respectively to transmit rotation of the driving shaft 26 to the crank shaft 12.

A plunger 34 is provided at its base with a cross head 36 mounted in the crank case 16 for slide movement through upper and lower guide members 38 of the crank case 16 and connected to a connecting rod 29 by means of a cross pin 37. The connecting rod 29 is provided with an eccentric ring rotatively fitted over the eccentric disk 14.

The plunger 34 extends through the crank case 16 into a pumping chamber 46 defined in a pump housing 40 which is secured to the casing 18. The pump housing 40 is provided at its lower and upper portions with a suction port 42 and a discharge port 44, respectively, in fluid communication with the pumping chamber 46 in the pump housing. A suction valve 48 is located in the flow path between the suction port 42 and the pumping chamber 46 to prevent any reverse flow of water 84 (see FIG. 5) from the pumping chamber 46 through the suction port 42. A discharge valve 52 is located in the flow path between the pumping chamber 46 and the discharge port 44 to prevent any reverse flow of water 84 (see FIG. 5) through the discharge port into the pumping chamber 46. Plugs 50 and 54 are screwed in openings formed in the housing 40 facing the suction and discharge valves 48 and 52 for closure thereof. A seal retainer 56 is positioned in the interiors of the crank case 16 and pump housing 40 at their junction and provided with a pair of axially spaced oil seals 58 and 60 retained therein and sealedly surrounding the plunger 34 to prevent lubricating oil in the crank case 16 from leaking through the plunger 34. A V-shaped packing 62 is urged against a step of the interior of the pump housing 40 by the seal retainer 56 for radial expansion to sealedly engage the periphery of the plunger 34, thereby sealing the pumping chamber 46.

Figure 3:
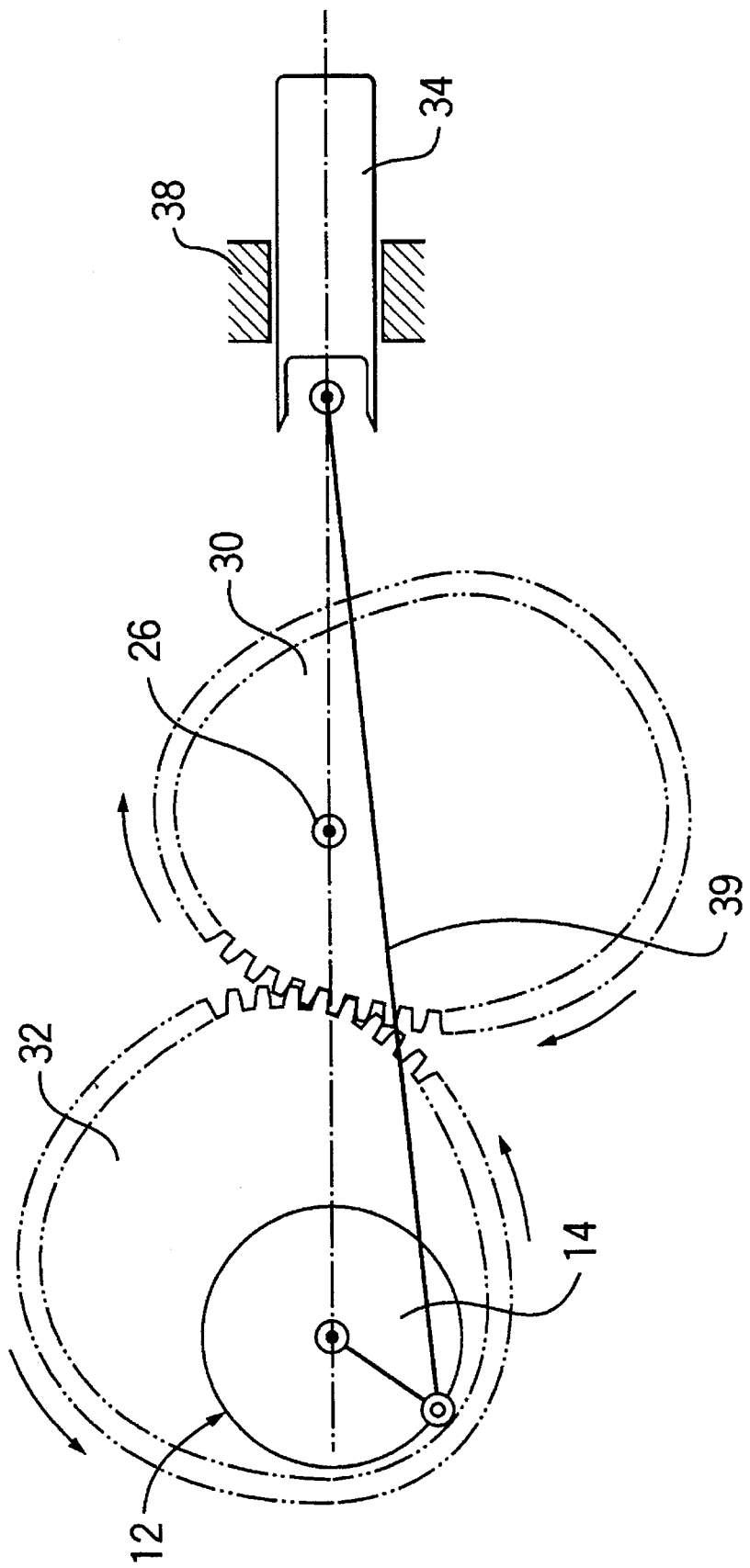
FIG. 3 is a schematic view of a driving mechanism of the plunger.

FIG. 3 shows schematically the drive mechanisms. A half of rotation of the crank shaft 12 provides a suction stroke wherein a volume of the pumping chamber 46 is increased while another half of rotation of the crank shaft 12 provides a discharge stroke wherein the volume of the pumping chamber 46 is reduced. This is substantially the same as in a conventional plunger pump. In the plunger pump according to the invention, rotation from a drive such as an engine is inputted to a driving shaft 26 for transmission through the non-circular driving and driven gears 30 and 32 to the crank shaft 26. These non-circular driving and driven gears may be designed and manufactured in accordance with the description of a literature entitled "Design and Manufacture of Non-circular gears and their application" of Machine Design No. 11, Volume 29, P13–P18, Author: Takashi YAMAZAKI of Nagaoka Haguruma Seisakusho Co., Ltd., Issued in September, 1985, which is incorporated herein by reference. The non-circular pitch curves of the non-circular gears 30 and 32 are designed such that the half of rotation of the crank shaft 26 at the discharge stroke of the plunger has a higher speed of rotation than during the other half of rotation of the crank shaft at the suction stroke of the plunger.

Figure 4:
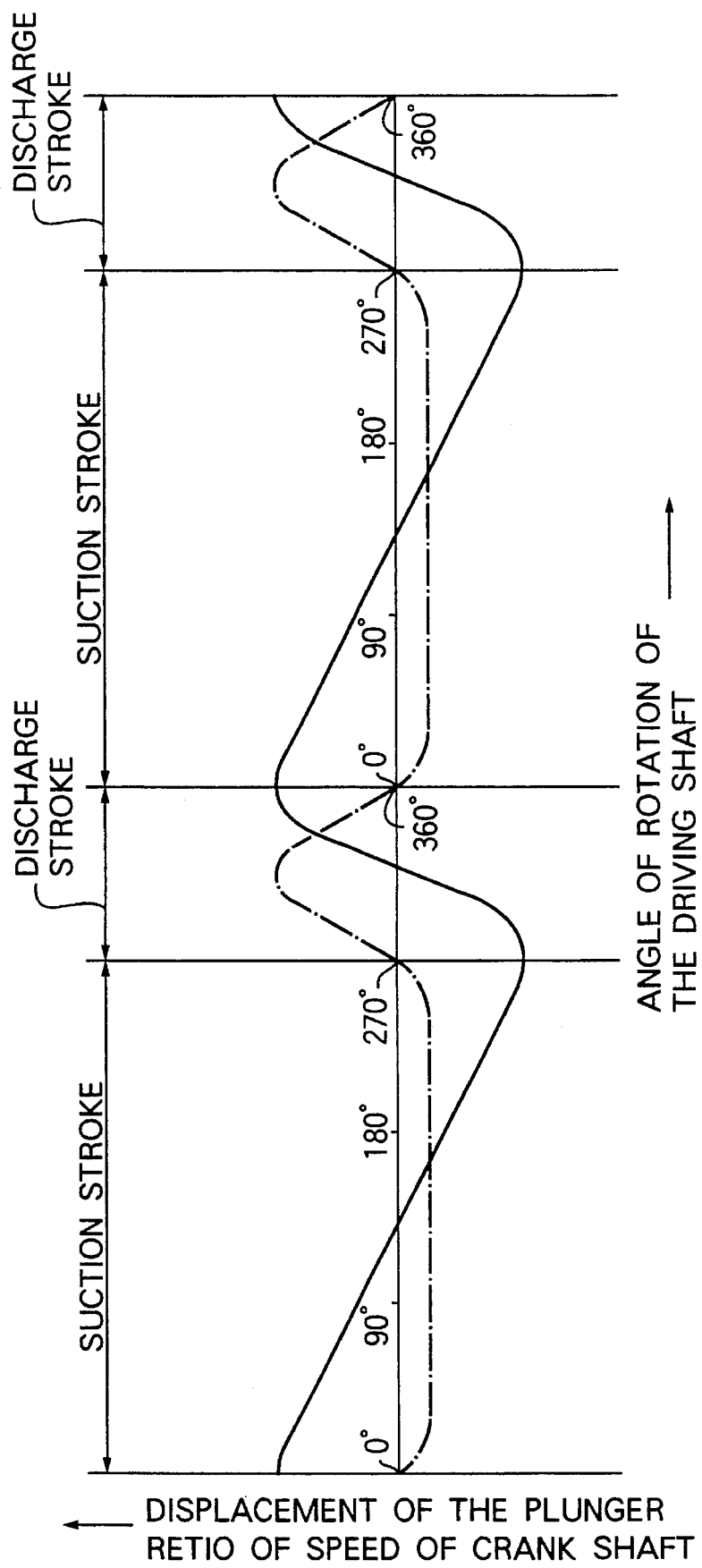
FIG. 4 is a graph representing the angle of rotation of the driving shaft in the axis of abscissa and displacement of the plunger and a ratio of the speed of rotation of crank shaft to the speed of rotation of the driving shaft in the axis of ordinate.

FIG. 4 is a graph representing the angle of rotation of the driving shaft 26 in the axis of abscissa and displacement of the plunger 34 and a ratio of the speed of rotation of crank shaft 12 to the speed of rotation of the driving shaft 26 in the axis of ordinate. Due to the fact that the pitch curves of the non-circular driving and driven gears 30 and 32 are set as shown in FIG. 3, the angles of rotation of the driving shaft 26 at the discharge and suction strokes are, for example, 90° and 270°, respectively. This results in increase in speed of rotation of the crank shaft 12 at the discharge stroke so that the speed of displacement of the plunger 34 is considerably increased at its discharge stroke to cause correspondingly quick reduction of the volume of the pumping chamber 46 for increase in the discharge pressure of water 84 to be intermittently discharged through the discharge port 44.

Figure 5:
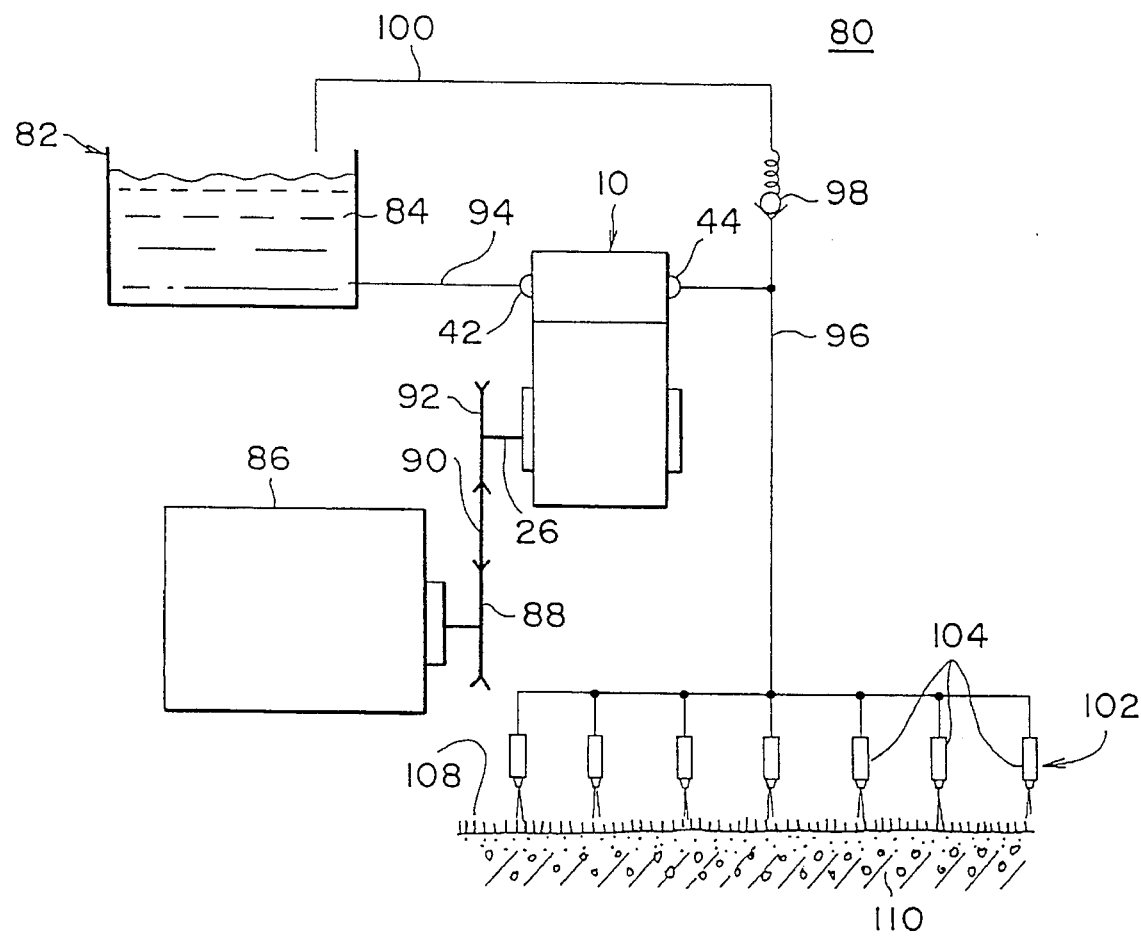
FIG. 5 is a schematic view of a high pressure liquid injecting apparatus equipped with the plunger pump according to the invention.

FIG. 5 is a schematic view of a high pressure liquid injecting apparatus 80 equipped with the plunger pump 10 according to the invention. High pressure liquid injecting apparatus 80 is mounted on a self- propelling vehicle travelling on the turf 108 and comprises a tank 82 containing water 84 and connected through a suction line 94 to the suction port 42 of the plunger pump 10. Rotative power from an engine 86 is transmitted through a V-belt 90 between V-pulleys 88 and 92 to the driving shaft 26 of the plunger pump 10 to drive the latter. Thus, the operation of the plunger pump 10 causes water 84 to be intermittently drawn from the tank 82 through the suction line 94 and suction port 42 and delivered through the discharge port 44 and a delivery line 96 under high pressure. A relief valve 98 is provided in a return line 100 connected between the delivery line 96 and the water tank 82 and opened to return the water 84 to the tank 82 when pressure in the delivery line 96 exceeds a predetermined pressure. There is provided a nozzle assembly 102 including a plurality of downwardly directed nozzles 104 arranged transversely to the direction of travel of vehicle in a row and connected to a manifold downstream of the delivery line 96. Water 84 which is intermittently delivered under pressure by the plunger pump 10 is injected through the nozzles 104 of the assembly 102 into the turf 108 in the intermittent way to form aerating holes in the soil 110 below the turf 108.

The high pressure liquid injecting apparatus 80 has no intermittent valve and accumulator which might cause difficulties in injecting liquid of chemicals containing fine particles. This makes it possible to inject liquid of a weed killer, fertilizer or the like rather than water 84 through the nozzles 104 into the turf for weedkilling and fertilization, thereby efficiently achieving maintenance of the turf.

It will be noted from the foregoing to provide the plunger pump wherein for the uniform speed of rotation inputted, the crank shaft can be rotated at a higher speed at the discharge stroke to increase the speed of reduction of the pumping chamber, thereby increasing the discharge pressure of the water.

What is claimed is:

1. A plunger pump comprising:

a pumping chamber, a reciprocating plunger mounted with respect to the pumping chamber to increase and reduce the volume of the pumping chamber during a suction stroke and discharge stroke of the plunger, respectively, a crank shaft connected through a connecting rod to said plunger for causing reciprocation of said plunger, an input shaft, and non-circular driving and driven gears keyed to said input shaft and said crank shaft, respectively, to transmit rotation from said input shaft to said crank shaft, said non-circular driving and driven gears having their pitch curves set such that said crank shaft is rotated more quickly through its angle of rotation at the discharge stroke than through the angle of rotation at the suction stroke of the plunger.

\* \* \* \* \*